July 27, 1965     J. CHASS     3,197,722

PRESSURE TRANSDUCER

Filed June 7, 1961

INVENTOR.
JACOB CHASS
BY Donald S. Cohen
ATTORNEY

United States Patent Office 3,197,722
Patented July 27, 1965

3,197,722
PRESSURE TRANSDUCER
Jacob Chass, Philadelphia, Pa., assignor to International Resistance Company, Philadelphia, Pa.
Filed June 7, 1961, Ser. No. 121,804
9 Claims. (Cl. 336—30)

The present invention relates to a pressure transducer, and more particularly to a differential transformer type pressure transducer the electrical output of which is varied by a variation in the pressure applied directly to the transformer.

In general, pressure transducers heretofore available comprise an electrical component whose electrical output can be varied, such as a variable resistor or a differential transformer, and a pressure responsive means, such as a diaphragm or Bourdon tube, connected to the electrical component to vary the electrical output of the component upon a change in the pressure applied to the pressure responsive means. The pressure responsive means is usually connected to the electrical component by means of a mechanical linkage. Such pressure transducers are relatively large in size, and complicated to assemble so that they are expensive to manufacture. Also, such pressure transducers are subject to inaccuracies caused by outside forces, such as shock, vibration and acceleration, applied to the transducer.

It is an object of the present invention to provide a novel pressure transducer for use in measuring pressure or a pressure differential.

It is another object of the present invention to provide a pressure transducer including a differential transformer, the electrical output of which is varied by a variation in the pressure applied directly to the transformer.

It is still another object of the present invention to provide a differential transformer type pressure transducer, the electrical output of which is varied by varying the permeability of the material of the core on which the transformer is mounted.

It is a further object of the present invention to provide a differential transformer type pressure transducer having improved linearity of the electrical output with respect to the pressure applied.

It is still a further object of the present invention to provide a differential transformer type pressure transducer having a variable zero set so that a zero electrical output can be obtained at any desired pressure or pressure differential.

It is still another object of the present invention to provide a pressure transducer which is relatively small, compact and easy to assemble so as to be inexpensive to manufacture.

Other objects will appear hereinafter.

For the purpose of illustrating the invention there is shown in the drawings forms which are presently preferred; it being understood, however, that this invention is not limited to the precise arrangements and instrumentalities shown.

Figure 1:
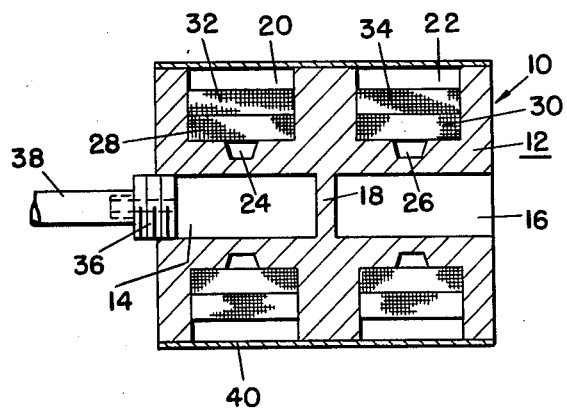
FIGURE 1 is a sectional view of a pressure transducer of the present invention.

Referring initially to FIGURE 1, the pressure transducer of the present invention is generally designated as 10.

Pressure transducer 10 comprises a core or bobbin 12 which is circular in transverse cross-section. The core or bobbin 12 is made of a magnetic material, the permeability of which will vary when the material is stressed, such as the permalloys. Core 12 has a pair of blind passages 14 and 16 extending longitudinally from the center of its opposite ends. The passages 14 and 16 are in longitudinal alignment, and are of the same length. Thus, the adjacent ends of the passages 14 and 16 are spaced apart by a web 18 which is intermediate the ends of the core 12. A pair of longitudinally spaced, annular grooves 20 and 22 are provided in the outer surface of the core 12. The grooves 20 and 22 are uniformly spaced from the respective ends of the core 12 so that the groove 20 is around the passage 14, and the groove 22 is around the passage 16. A narrow annular compensating groove 24 is provided in the bottom surface of the groove 20, and a similar annular compensating groove 26 is provided in the bottom surface of the groove 22. The side walls of the narrow annular compensating grooves 24 and 26 are preferably tapered toward each other radially inwardly from the bottom surfaces of the grooves 20 and 22 respectively.

A primary winding 28 of an insulated, electrically conductive wire is helically wound around the core 12 within the annular groove 20. A second primary winding 30 of an insulated, electrically conductive wire is helically wound around the core 12 within the annular groove 22. The primary windings 28 and 30 are of the same length. A secondary winding 32 of an insulated, electrically conductive wire is helically wound around the core 12 within the annular groove 20, and a second secondary winding 34 of an insulated electrically conductive wire is helically wound around the core 12 within the annular groove 22. The secondary windings 32 and 34 are of the same length. Although the secondary windings 32 and 34 are shown as being wound around the primary windings 28 and 30, respectively, the primary windings 28 and 30 may be wound around the secondary windings 32 and 34 respectively.

Figure 2:
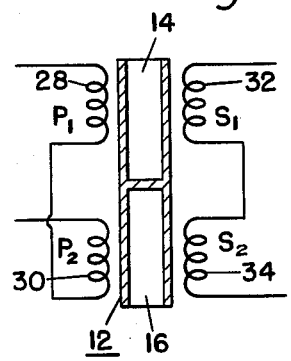
FIGURE 2 is a schematic view of the electrical circuit of the pressure transducer shown in FIGURE 1.

As shown in FIGURE 2, the primary windings 28 and 30 are electrically connected to each other, and the secondary windings 32 and 34 are electrically connected to each other. The connection between the primary windings 28 and 30, and between the secondary windings 32 and 34 are such that when an A.C. current is applied to the primary windings 28 and 30, the voltages induced across the secondary windings 32 and 34 will be of opposite polarity. Thus, when the voltages induced across the secondary windings 32 and 34 are of equal magnitude, the voltages will balance each other so that the electrical output from the secondary windings will be zero. However, if the voltage induced across either of the secondary windings becomes greater than the voltage induced across the other secondary winding, there will be provided an output signal from the secondary windings which is equal to the difference between the voltages induced across the secondary windings and of a polarity corresponding to that of the voltage of greater magnitude. As shown in FIGURE 2, the primary windings 28 and 30 are electrically connected in series bucking relation, and the secondary windings 32 and 34 are connected in series aiding relation. However, the same result can be achieved by connecting the primary windings 28 and 30 in series aiding relation, and the secondary windings 32 and 34 in series bucking relation.

As shown in FIGURE 1, an inlet port 36 is secured in the open end of the passage 14 in the core 12. A pipe 38 secured to the inlet port 36 connects the passage 14 to the source of the pressure to be measured. If desired, an inlet port may also be secured in the open end of the passage 16. A tubular sleeve 40 of a magnetic material extends around and is secured to the outer surface of the core 12.

In the use of the pressure transducer 10 of the present invention, the primary windings 28 and 30 are connected to a source of A.C. current. The passage 14 in the core 12 is connected through the pipe 38 to the source of the pressure to be measured, and the passage 16 is left open to the atmosphere. If the pressure being measured is equal to the pressure within the passage 16, i.e. atmospheric pressure, the voltages induced across the secondary windings 32 and 34 will be equal and of opposite polarity. Thus, the voltages across the secondary windings 32 and 34 will balance each other out, and the electrical output of the pressure transducer 10 will be zero. If the pressure being measured increases from atmospheric pressure, the pressure will apply a force to the wall of the passage 14, and will stress the portion of the core 12 around the passage 14. The stressing of the portion of the core 12 around the passage 14 varies the permeability of the material of that portion of the core. The change in the permeability of the portion of the core 12 around the passage 14 causes a change in the voltage induced across the secondary winding 32. If the permeability increases, the voltage induced across the secondary winding 32 increases, and if the permeability decreases, the voltage induced across the secondary winding 32 decreases. Whether the permeability of the material of the core 12 increases or decreases when the core is stressed depends on the particular characteristics of the particular material used for the core. Such information can be obtained from any handbook on the electrical properties of materials, or from the manufacturer of the material.

Although the increase in the pressure within the passage 14 causes a change in the voltage induced across the secondary winding 32, the voltage induced across the secondary 34 remains the same since the pressure in the passage 16 is constant, and therefore does not stress the portion of the core 12 around the passage 16. Thus, a change in the pressure within the passage 14 causes the voltage induced across the secondary winding 32 to be different from the voltage induced across the secondary 34 so that there is produced an electrical output from the transducer 10 corresponding to the difference in the pressures within the passages 14 and 16. Thus, by pre-calibrating the pressure transducer 10, the electrical output from the transducer can be read as the pressure being measured. By connecting the passage 16 in the core 12 to a second source of pressure, the pressure transducer 10 of the present invention can be used to measure a pressure differential. In such use, a variation of the pressure applied to either of the passages 14 and 16 will cause a variation in the stress applied to the portion of the core around the passage so as to vary the voltage induced across the secondary winding around the passage.

In the use of the pressure transducer 10 of the present invention, it was found that the variation in the voltage induced across a secondary winding caused by a variation of the permeability of the material of the core when the pressure applied to the core is varied is substantially but not quite linear with respect to the variation in the pressure applied to the core. It was found that the linearity of the variation of the voltage induced across a secondary winding with respect to the variation in pressure applied to the core was substantially improved by providing the narrow annular compensating grooves 24 and 26 in the bottom surfaces of the grooves 20 and 22. The narrow annular compensating grooves 24 and 26 reduce the cross-sectional thickness of a portion of that portion of the core between the secondary windings and the passages 14 and 16. Thus, when the pressure within the passages 14 and 16 is increased, the stressing of the core 12 is first concentrated in the portions of reduced cross-sectional thickness. It has been found that this concentration of the stresses substantially improves the linearity of the variation in the voltage induced across the secondary windings with respect to the change in pressure.

Although the narrow, annular compensating grooves 24 and 26 are shown in the bottom surfaces of the grooves 20 and 22, they may be provided in the cylindrical surfaces of the passages 14 and 16 so as to provide portions of reduced cross-sectional thickness.

Figure 3:
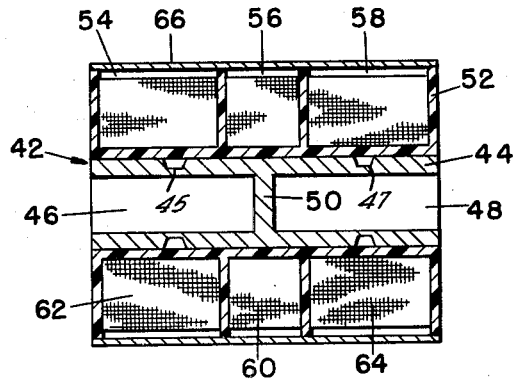
FIGURE 3 is a sectional view of a modification of the pressure transducer of the present invention.

Referring to FIGURE 3, a modification of the pressure transducer of the present invention is generally designated as 42.

Pressure transducer 42 comprises a core 44 which is circular in transverse cross-section. The core 44 is made of a magnetic material, the permeability of which varies when the material is stressed, such as the permalloys. The core 44 is provided with a pair of blind passages 46 and 48 extending longitudinally from the opposite ends of the core. The passages 46 and 48 are in longitudinal alignment, and are of the same length. Thus, the adjacent ends of the passages 46 and 48 are spaced apart by a web 50 which is intermediate the ends of the core 44.

A tubular bobbin 52 of a non-magnetic material, such as a plastic, is provided around the core 44. Bobbin 52 has three longitudinally spaced, annular grooves 54, 56 and 58 in its outer surface. The end grooves 54 and 58 are of the same width, and the center groove 56 is intermediate the ends of the bobbin 52. The inner diameter of the bobbin 52 is substantially equal to the outer diameter of the core 44 so that the core fits tightly within the bobbin 52. When the bobbin 52 is mounted on the core 44, the passage 46 in the core extends across the entire width of the end groove 54 and a portion of the center groove 56. The passage 48 in the core 44 extends across the entire width of the end groove 58, and a portion of the center groove 56.

A primary winding 60 of an insulated, electrically conductive wire is helically wound around the bobbin 52 within the groove 56. A first secondary winding 62 of an insulated, electrically conductive wire is helically wound around the bobbin 52 within the groove 54, and a second secondary winding 64 of an insulated, electrically conductive wire is helically wound around the bobbin within the groove 58. The secondary windings 62 and 64 are of the same length, and are electrically connected in series bucking relation. By series bucking relation it is meant that when an A.C. current is applied to the primary winding 60, voltages are induced across the secondary windings 62 and 64 of opposite polarity. Thus, when the voltages induced across the secondary windings 62 and 64 are of equal magnitude, they will balance each other so that the output from the secondary windings is zero. However, if the voltage induced across either of the secondary windings is greater than the voltage across the other secondary winding, there is provided an output from the secondary windings equal to the difference between the induced voltages, and of a polarity corresponding to that of the voltage of greater magnitude. A sleeve 66 of a magnetic material is provided around and secured to the bobbin 52.

In the use of the pressure transducer 42, the pressure transducer operates in substantially the same manner as previously described with regard to the pressure transducer 10 of FIGURE 1. When an A.C. current is applied to the primary winding 60, voltages are induced across the secondary windings 62 and 64. When the pressures within the passages 46 and 48 are equal, for example atmospheric pressure, the permeability of the material of the core 44 will be uniform along the entire length of the core so that the voltages induced across the secondary windings 62 and 64 will be of equal magnitude. Thus, the output from the transducer 42 will be zero. When the pressure within either of the passages 46 and 48 increases, the portion of the core 44 around the passage will be stressed so as to vary the permeability of that portion of the core. This causes a variation in the voltage induced across the secondary winding around the stressed portion of the core so as to provide an output signal from the transducer 42. By pre-calibrating the pressure transducer 42, the output signal from the transducer can be read as the pressure or pressure differential applied to the transducer. If desired, the core 44 of the pressure transducer 42 can be provided with a pair of narrow, annular compensating grooves 45 and 47 similar to the compensating grooves 24 and 26 in the core 12 of the pressure transducer 10 of FIGURE 1 to improve the linearity of the output of the transducer with respect to the applied pressure. Such compensating grooves 45 and 47 are positioned along the core 44 so that each of the grooves is within a separate one of the secondary windings 62 and 64.

Figure 4:
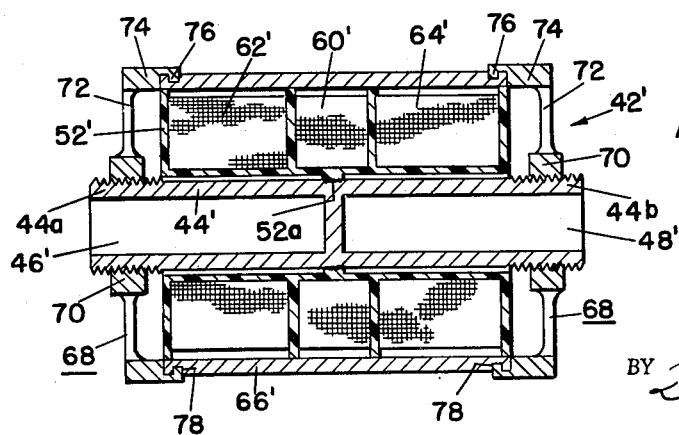
FIGURE 4 is a sectional view of still another modification of the pressure transducer of the present invention.

Referring to FIGURE 4, another modification of the pressure transducer of the present invention is generally designated as 42'. Pressure transducer 42' is provided with a variable zero set so that a zero electrical output can be obtained at any desired pressure or pressure differential applied to the transducer.

Pressure transducer 42' is similar to the pressure transducer 42 of FIGURE 3 except that the core 44' is of a length to project beyond the ends of the bobbin 52'. The end portions 44a and 44b of the core 44' are externally threaded. The bobbin 52' is fixedly secured to the core 44' only a point intermediate the ends of the bobbin 52' and the core 44', such as by the internal annular rib 52a on the bobbin 52'. The remaining portions of the bobbin 52' are free from the core 44'. The bobbin 52' is provided with the primary winding 60' wound thereon, and the secondary windings 62' and 64' wound thereon on opposite sides of the primary winding 60'. A sleeve 66' of a magnetic material surrounds and is secured to the bobbin 52'.

A separate nut 68 is provided on each of the end portions 44a and 44b of the core 44'. Each of the nuts 68 comprises an annular hub 70 which is internally threaded, and which is threaded on a respective end portion 44a and 44b of the core 44'. Spring fingers 72 extend radially outwardly from the outer periphery of each of the hubs 70. Cylindrical flanges 74 are secured to the outer ends of the spring fingers 72. The flanges 74 extend toward the adjacent ends of the sleeve 66'. Each of the cylindrical flanges 74 has a hook-shaped lip 76 which rotatably fits in an annular groove 78 in the outer surface of the sleeve 66'. Thus, the nuts 68 can rotate with respect to the sleeve 66' and bobbin 52', but the cylindrical flanges 74 of the nuts 68 are prevented from moving longitudinally with respect to the sleeve 66' and bobbin 52'.

In the use of the pressure transducer 42', the pressure transducer can be adjusted to provide a zero output at a desired pressure by rotating one of the nuts 68, for example the nut on the end 44b of the core 44', so that the hub 70 of the nut 68 moves toward the bobbin 52'. Since the cylindrical flange 74 of the nut 68 cannot move longitudinally with respect to the bobbin 52', the longitudinal movement of the hub 70 bends the spring fingers 72 and places them under tension. The resiliency of the spring fingers 72 tend to return the spring fingers back to their normal position, and thereby applies a force on the portion of the core 44' around the passage 48'. This stresses the portion of the core 44' around the passage 48' so as to vary the permeability of that portion of the core, and thereby vary the voltage induced across the secondary winding 64'. When atmospheric pressure is within the passage 46' of the core 44', the portion of the core around the passage 46' is not stressed so that the voltage induced across the secondary winding 62' is different from the voltage induced across the primary winding 64'. Thus, with atmospheric pressure in both of the passages 46' and 48' the rotation of the nut 68 around the end 44b of the core provides an output signal from the transducer 42'.

In order to obtain a zero output from the transducer 42', the pressure applied within the passage 46' in the core 44' must be increased to stress the portion of the core around the passage 46' to a degree equal with the stress applied to the portion of the core around the passage 48' by the nut 68. Thus, the pressure transducer 42' can be adjusted by the nuts 68 to achieve a zero output at any desired pressure or pressure differential applied to the passages 46' and 48'.

The pressure transducer 10 of FIGURE 1 can also be provided with a variable zero set. For this purpose the core 12 is provided with threaded end projections similar to the threaded ends 44a and 44b of the core 44' of the pressure transducer 42' of FIGURE 4. Nuts 68 are threaded on the end projections with the cylindrical flanges 74 of the nuts being secured to the sleeve 40 so that the nuts can rotate with respect to the sleeve, but the cylindrical flanges 74 cannot move longitudinally with respect to the sleeve. The sleeve 40 is secured to the core 12 only at a point intermediate the ends of the core, and with the remaining portions of the sleeve being free from the core. The variable zero set can then be achieved in the manner previously described with regard to the pressure transducer 42' of FIGURE 4.

The present invention may be embodied in other specific forms without departing from the spirit or essential attributes thereof and, accordingly, reference should be made to the appended claims, rather than to the foregoing specification as indicating the scope of the invention.

I claim:

1. A pressure transducer comprising a core of a magnetic material the permeability of which is varied by stressing the material, said core having a separate longitudinally extending blind passage in each end thereof and a separate annular compensating groove around each of said passages, a first secodary winding of an insulated electrically conductive wire around said core and encircling one of said passages and one of said compensating grooves, a second secondary winding of an insulated electrically conductive wire around said core and encircling the other of said passages and the other of said compensating grooves, and a primary winding means around said core and adapted to induce a voltage across each of said secondary windings when a current is passed through the primary winding, said secondary windings being electrically connected so that the voltages induced across the secondary windings are of opposite polarity.

2. A pressure transducer comprising a core of a magnetic material the permeability of which is varied by stressing the material, said core being circular in transverse cross-section, and having a separate longitudinally extending blind passage in each end thereof and a pair of annular grooves in the outer surface thereof, each of said grooves being around a separate one of said passages, a separate primary winding of an insulated electrically conductive wire wound around said core in each of said grooves, said primary windings being of the same length and being electrically connected together, a separate secondary winding of an insulated electrically conductive wire wound around the core in each of said grooves, said secondary windings being of the same length and being electrically connected together, the connections between said primary windings and between said secondary windings being such that when a current is passed through said primary windings, the voltages induced across said secondary windings are of opposite polarity.

3. A pressure transducer in accordance with claim 2 including a pair of annular compensating grooves in the core, each of said compensating grooves being located within a separate one of said first mentioned grooves so as to reduce the thickness of a portion of the core between the first mentioned grooves and the passages.

4. A pressure transducer in accordance with claim 2 in which the pasages are of equal length, and the adjacent ends of the passages are spaced apart by a web which is intermediate the ends of the core.

5. A pressure transducer in accordance with claim 2 including a sleeve of a magnetic material surrounding and secured to the core.

6. A pressure transducer comprising a core of a magnetic material the permeability of which is varied by stressing the material, said core being circular in transverse cross-section and having a separate longitudinally extending blind passage in each end thereof, a tubular bobbin of a nonmagnetic material around and in contact with said core, said bobbin having three longitudinally spaced annular grooves in its outer surface, each of the end grooves in said bobbin being around a separate one of the passages in said core, a primary winding of an insulated electrically conductive wire wound around said bobbin within the middle groove, and a separate secondary winding of an insulated electrically conductive wire wound around said bobbin within each of the end grooves, said secondary windings being electrically connected in series bucking relation.

7. A pressure transducer in accordance with claim 6 including a pair of annular compensating grooves in the core, each of said compensating grooves being located within a separate one of the end grooves in the bobbin so as to reduce the thickness of a portion of the core around each of the passages in the core.

8. A pressure transducer in accordance with claim 6 in which the passages in the core are of equal length, and the adjacent ends of the passages are spaced apart by a web which is within the middle groove in the bobbin.

9. A pressure transducer in accordance with claim 6 including a sleeve of a magnetic material surrounding and secured to the bobbin.

References Cited by the Examiner

UNITED STATES PATENTS

| | | | |
|---|---|---|---|
| 2,427,866 | 9/47 | Macgeorge. | |
| 2,459,210 | 1/49 | Ashcraft. | |
| 2,570,672 | 10/51 | Hathaway. | |
| 2,683,989 | 7/54 | Clark | 336—30 X |
| 2,887,882 | 5/59 | Richter | 336—30 X |
| 2,952,000 | 9/60 | Wolfe | 336—30 |

LARAMIE E. ASKIN, *Primary Examiner.*

JOHN F. BURNS, *Examiner.*